Dec. 25, 1934.  E. G. McDONALD  1,985,418

BRAKE

Filed Dec. 17, 1930  2 Sheets-Sheet 1

INVENTOR.
EUGENE G. McDONALD
BY M. W. McConkey
ATTORNEY

Dec. 25, 1934.  E. G. McDONALD  1,985,418
BRAKE
Filed Dec. 17, 1930   2 Sheets-Sheet 2

INVENTOR.
EUGENE G. McDONALD
BY  M. W. McConkey
ATTORNEY

Patented Dec. 25, 1934

1,985,418

UNITED STATES PATENT OFFICE 1,985,418

BRAKE

Eugene G. McDonald, South Bend, Ind., assignor to Bendix Brake Company, South Bend, Ind., a corporation of Illinois Application December 17, 1930, Serial No. 502,910

3 Claims. (Cl. 188—194)

This invention relates to brakes and is illustrated as embodied in an internal expanding brake for an automobile. An object of the invention is to provide novel means for operating a brake of the shiftable-anchorage type, particularly where it is desired to mount the brake on the front wheel of an automobile. One feature of the invention relates to a novel form of applying means for this kind of brake adapted to be actuated by a thrust rod or the like extending downwardly through a hollow king pin upon which the wheel is swiveled. Another feature of the invention relates to the mounting of an operating lever, which may be operated by the above-described thrust rod, and which operates a floating applying device which does not interfere with the shifting of the friction means of the brake from one anchorage to the other.

The above and other objects and features of the invention, including a novel construction of brake shoe and other novel and desirable details, will be apparent from the following description of the illustrative embodiments shown in the accompanying drawings, in which.

Figure 1:
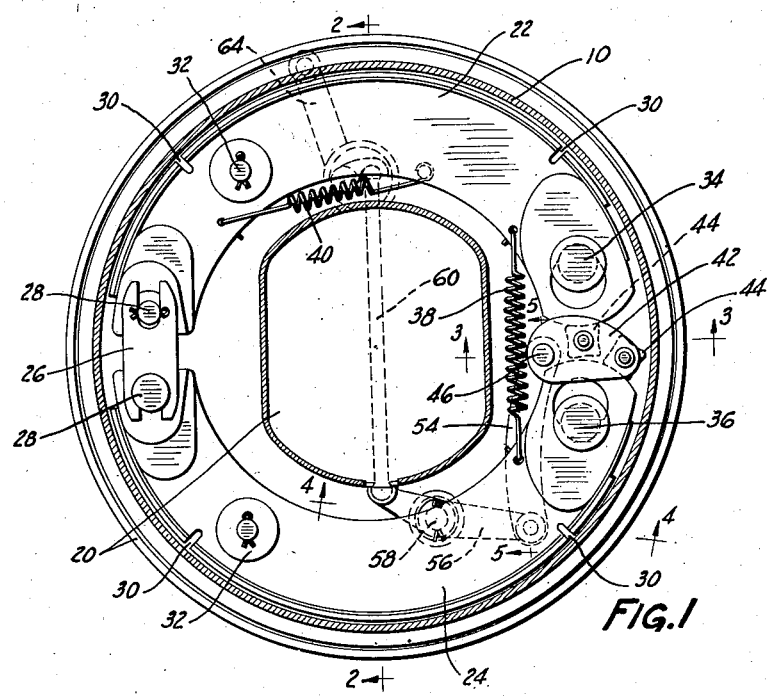
Figure 1 is a vertical section through the brake just inside the head of the brake drum and showing the brake friction means in side elevation.

In the brake selected for illustration, a drum 10 is rotatably mounted with a wheel, the hub of which is shown at 12, on a front knuckle 14 swiveled by means such as a hollow king pin 16 at one end of the usual front axle 18. The knuckle 14 also carries a support such as a backing plate 20 arranged at the open side of the brake drum.

Within the drum 10 is arranged the friction means of the brake, preferably including a pair of shoes 22 and 24 connected by means such as an adjustable joint 26 connected to the shoe ends by pivots 28.

According to an important minor feature of the invention, the shoes 22 and 24 are rendered slightly flexible near their ends by slots 30 extending through the rims of the shoes and a short distance into the outer portion of the webs of the shoes. The shoes may be provided with any suitable steady rests 32. If the drum is turning clockwise when the brake is applied, the shoe 22 anchors on a fixed anchor post 34 carried by the backing plate, whereas if the drum is turning counter-clockwise, the shoe 24 anchors on a fixed anchor post 36 also carried by the backing plate.

Figures 2, 3, 4:
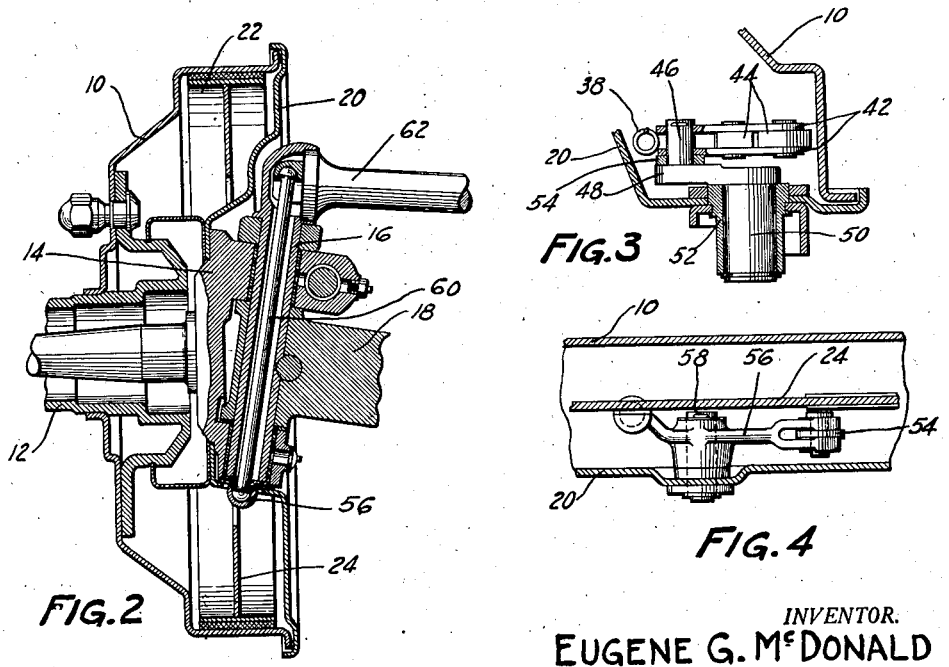
Figure 2 is a vertical section through the brake on the line 2—2 of Figure 1 and showing the mounting of the brake on the front wheel knuckle.
Figure 3 is a partial section on the line 3—3 of Figure 1 showing the floating applying means engaging the ends of the brake shoes or their equivalents.
Figure 4 is a partial section on the line 4—4 of Figure 1 showing the mounting of a novel operating lever for the brake.

The brake is applied, against the resistance of a main return spring 38 tensioned between the shoes and an auxiliary return spring 40 tensioned between the shoe 22 and the backing plate, by means such as a floating lever built up of a pair of side plates 42 carrying between them a pair of pivotally mounted thrust blocks 44 engaging the shoe ends. As best appears in Figure 3, the plates 42 of this floating lever are mounted on a pivot 46 forged integrally at the end of a crank arm 48 formed on a suitable shaft 50 journaled in a bearing 52 carried by the backing plate. The crank arm 48 and stub shaft 50 in effect form an oscillating support for the above-described floating lever.

According to the present invention, the above-described floating lever (the form of which per se was known before the present application) is operated by means such as a compression link 54 pivoted at its upper end on the pivot 46 and pivoted at its lower end to an operating lever 56 fulcrumed behind the web of the shoe 24 on a pivot 58 carried by the backing plate. The other arm of the lever 56 extends below and in line with the hollow king pin 16 and is formed with a socket to receive the rounded lower end of a thrust rod 60 passing through the hollow king pin 16. The upper end of the thrust rod 60 is also rounded and is engaged by the eccentric socket in an operating shaft 62 supported by suitable brackets (not shown) on the front axle 18. The shaft 62 and its mounting on the axle may be of any suitable type known in the art. The shaft 62 is provided with a suitable operating lever 64 connected to the usual brake hookup.

Figure 6:
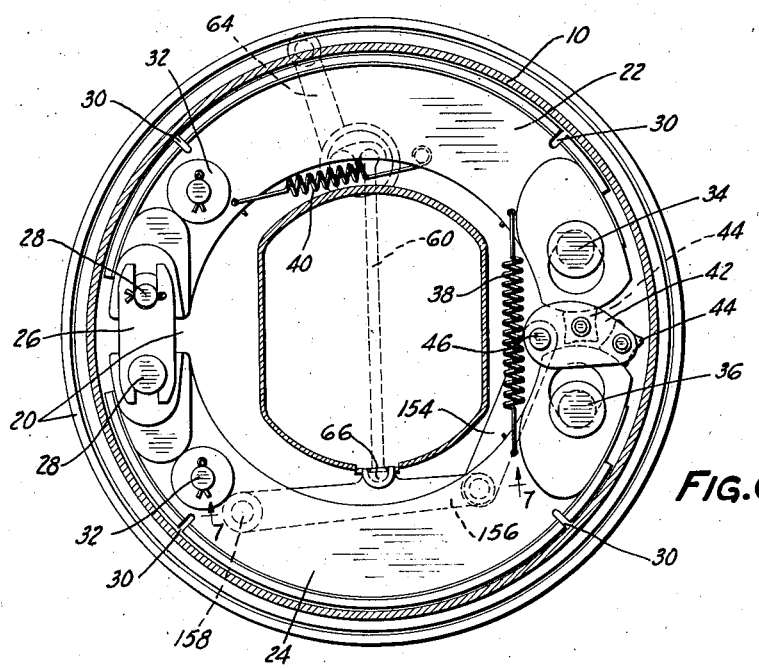
Figure 6 is a section corresponding to Figure 1, but showing a modified form of brake applying means.
Figure 7:
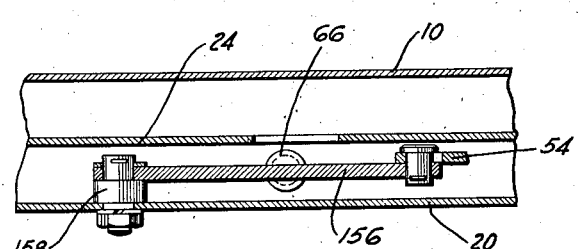
Figure 7 is a partial section on the line 7—7 of Figure 6 showing the mounting of the operating lever.
Figure 5:
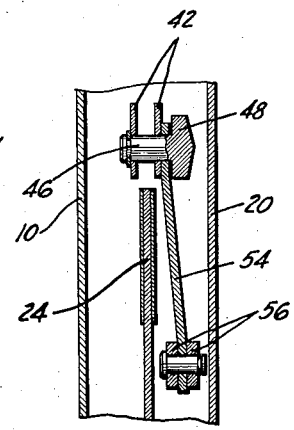
Figure 5 is a partial section on the line 5—5 of Figure 1 showing the connection between the operating lever and the floating brake applying lever.

In the arrangement of Figures 6 and 7, the pivot 46 is rocked to apply the brake by a tension link 154 pivotally connected at its lower end to a lever 156 extending generally horizontally across the lower portion of the brake between the backing plate and the shoe 24. The lever 156 is fulcrumed at its opposite end on a pivot 158 carried by the backing plate and at an intermediate point has a part formed as a socket 66 below and in alignment with the hollow king pin 16 and receiving the rounded lower end of the above-described thrust rod 60.

It will be noted that in both arrangements the lengthwise movement of the rod 60 operates the floating applying device to force the brake shoes or their equivalents against the drum to apply the brake without interfering in any way with the shifting necessary to permit the friction means to anchor at one end or the other according to the direction of drum rotation. As these brakes are ordinarily mounted on a car, the left side in Figures 1 and 6 is toward the front of the car.

While two illustrative embodiments have been described in detail, it is not my intention to limit the scope of the invention to these particular embodiments or otherwise than by the terms of the appended claims. The present application is intended to be junior to my application No. 493,929, filed November 7, 1930, and assigned to Bendix Brake Company.

I claim:

1. A vehicle having a wheel with a mounting including a hollow king pin, in combination with a brake of the shiftable-anchorage type having a floating applying device, a lever connected to the applying device and having a part in line with the king pin, and force-transmitting means acting through the hollow king pin on said part of the lever.

2. A vehicle having a wheel with a mounting including a generally-vertical hollow king pin, in combination with a brake provided with an applying device, a generally-horizontal lever fulcrumed at one end and connected to the applying device at its other end and having an intermediate part in line with the king pin, and force-transmitting means acting through the hollow king pin on said intermediate part of the lever.

3. A brake-applying means comprising an arm fulcrumed at one end and provided with a pivot at its other end, a floating thrust lever mounted on said pivot, and an operating lever linked to said pivot.

EUGENE G. McDONALD.